(12) United States Patent
Saito et al.

(10) Patent No.: US 10,710,349 B2
(45) Date of Patent: Jul. 14, 2020

(54) THERMOPLASTIC ADHESIVE FILM, BONDING METHOD AND BONDED BODY

(71) Applicant: AICELLO CORPORATION, Aichi (JP)

(72) Inventors: Shigenori Saito, Aichi (JP); Hitoshi Asano, Aichi (JP); Hiroyuki Matsuda, Aichi (JP)

(73) Assignee: AICELLO CORPORATION, Toyohashi-shi (JP)

( * ) Notice: Subject to any disclaimer, the term of this patent is extended or adjusted under 35 U.S.C. 154(b) by 0 days.

(21) Appl. No.: 16/084,875

(22) PCT Filed: Mar. 15, 2017

(86) PCT No.: PCT/JP2017/010297
§ 371 (c)(1),
(2) Date: Sep. 13, 2018

(87) PCT Pub. No.: WO2017/159707
PCT Pub. Date: Sep. 21, 2017

(65) Prior Publication Data
US 2019/0077135 A1    Mar. 14, 2019

Related U.S. Application Data

(63) Continuation of application No. PCT/JP2017/010297, filed on Mar. 15, 2017.

(30) Foreign Application Priority Data

Mar. 16, 2016 (JP) .................................. 2016-052575

(51) Int. Cl.
*C09J 123/26* (2006.01)
*C09J 123/02* (2006.01)
(Continued)

(52) U.S. Cl.
CPC ................ *B32B 27/32* (2013.01); *B32B 7/12* (2013.01); *B32B 27/00* (2013.01); *B32B 27/34* (2013.01);
(Continued)

(58) Field of Classification Search
None
See application file for complete search history.

(56) References Cited

U.S. PATENT DOCUMENTS 4,058,647 A    11/1977   Inoue et al.
4,081,414 A *  3/1978   Abe ........................ C09J 109/00
                                                    524/273
(Continued)

FOREIGN PATENT DOCUMENTS

CN       101245228 A    8/2008
CN       103118872 A    5/2013
(Continued)

OTHER PUBLICATIONS

Notification of the First Office Action dated Feb. 27, 2019, from the State Intellectual Property Office of People's Republic of China in counterpart Application No. 201780017574.1.
(Continued)

*Primary Examiner* — Frank D Ducheneaux
(74) *Attorney, Agent, or Firm* — Sughrue Mion, PLLC (57) ABSTRACT

The objective of the present invention is to provide a thermoplastic adhesive film capable of, in a thermobonding step of a laminated body of different materials used particularly in automobile members, electronic members, construction members, etc., such as a polypropylene resin material, a polyamide resin material, and a metal material such as aluminum or steel plates, preventing deformation of the resin material and peeling due to thermal history after molding. Provided as a solution is a thermoplastic adhesive film comprising a resin composition (D) which contains a thermoplastic olefin elastomer resin (A), an acid-modified polypropylene resin (B) and a nucleating agent (C).

7 Claims, 1 Drawing Sheet

(51) Int. Cl.
*C09J 123/12* (2006.01)
*C09J 123/14* (2006.01)
*C09J 7/00* (2018.01)
*C09J 7/10* (2018.01)
*C08K 5/00* (2006.01)
*B32B 27/32* (2006.01)
*B32B 27/34* (2006.01)
*B32B 27/00* (2006.01)
*B32B 7/12* (2006.01)
*C09J 151/06* (2006.01)
*C09J 123/16* (2006.01)

(52) U.S. Cl.
CPC . *C09J 7/00* (2013.01); *C09J 7/10* (2018.01); *C09J 123/02* (2013.01); *C09J 123/12* (2013.01); *C09J 123/14* (2013.01); *C09J 123/16* (2013.01); *C09J 123/26* (2013.01); *C09J 151/06* (2013.01); *C08K 5/0083* (2013.01); *C09J 2201/61* (2013.01); *C09J 2201/622* (2013.01); *C09J 2205/102* (2013.01); *C09J 2423/10* (2013.01); *C09J 2423/16* (2013.01); *C09J 2451/00* (2013.01)

(56) References Cited

U.S. PATENT DOCUMENTS

| | | |
|---|---|---|
| 4,338,228 A | 7/1982 | Inoue et al. |
| 4,562,230 A | 12/1985 | Fukui et al. |
| 4,957,968 A | 9/1990 | Adur et al. |
| 6,029,710 A | 2/2000 | Rigosi et al. |
| 2003/0041963 A1 | 3/2003 | Gong et al. |
| 2005/0003197 A1 | 1/2005 | Good et al. |
| 2007/0197712 A1 | 8/2007 | Fujiwara |
| 2012/0077048 A1 | 3/2012 | Botros |
| 2012/0319318 A1 | 12/2012 | Wang et al. |
| 2013/0203900 A1 | 8/2013 | Ellis et al. |
| 2013/0260064 A1 | 10/2013 | Botros |
| 2015/0045513 A1 | 2/2015 | Ravishankar et al. |
| 2015/0217544 A1 | 8/2015 | Hu et al. |
| 2015/0225611 A1 | 8/2015 | Ellis et al. |
| 2015/0247068 A1 | 9/2015 | Schroeyers et al. |
| 2015/0322303 A1 | 11/2015 | Coffey et al. |
| 2016/0115306 A1 | 4/2016 | Ravishankar et al. |
| 2017/0283668 A1 | 10/2017 | Ellis et al. |

FOREIGN PATENT DOCUMENTS

| | | |
|---|---|---|
| EP | 0 370 786 A2 | 5/1990 |
| EP | 0 904 332 A1 | 3/1999 |
| JP | 51-098784 A | 8/1976 |
| JP | 56-055450 A | 5/1981 |
| JP | 58-149935 A | 9/1983 |
| JP | 02-140280 A | 5/1990 |
| JP | 09-095649 A | 4/1997 |
| JP | 2000-504997 A | 4/2000 |
| JP | 2000-512683 A | 9/2000 |
| JP | 2005-500428 A | 1/2005 |
| JP | 2005-048166 A | 2/2005 |
| JP | 2006-241444 A1 | 9/2006 |
| JP | 2014-501811 A | 1/2014 |
| JP | 2014-047252 A | 3/2014 |
| JP | 2014-069516 A | 4/2014 |
| JP | 2015-531324 A | 11/2015 |
| JP | 2015-532335 A | 11/2015 |
| WO | 97/48777 A1 | 12/1997 |
| WO | 2005/087864 A1 | 9/2005 |
| WO | 2012/044768 A1 | 4/2012 |
| WO | 2014/119565 A1 | 8/2014 |

OTHER PUBLICATIONS

International Search Report (PCT/ISA/210) dated Jun. 20, 2017 issued by the International Searching Authority in International Application No. PCT/JP2017/010297.

Written Opinion (PCT/ISA/237) dated Jun. 20, 2017 issued by the International Searching Authority in International Application No. PCT/JP2017/010297.

Communication dated Jul. 11, 2017 issued by the Japanese Patent Office in counterpart Japanese Application No. 2016-052575.

Communication dated Apr. 18, 2017 issued by the Japanese Patent Office in counterpart Japanese Application No. 2016-052575.

Notice of Preliminary Rejection dated Oct. 22, 2018, issued by the Korean Intellectual Property Office in counterpart Korean Application No. 10-2018-7026656.

Examination Report dated Jan. 29, 2020 by the Indian Patent Office in counterpart Application No. 201817034635.

Extended European Search Report dated Dec. 4, 2019, from the European Patent Office in counterpart European Application No. 17766703.7.

* cited by examiner

[FIG. 1]

Viscosity increase initiation temperature

[FIG. 2]

THERMOPLASTIC ADHESIVE FILM, BONDING METHOD AND BONDED BODY

CROSS REFERENCE TO RELATED APPLICATIONS

This application is a National Stage of International Application No. PCT/JP2017/010297 filed Mar. 15, 2017, claiming priority based on Japanese Patent Application No. 2016-052575 filed Mar. 16, 2016.

TECHNICAL FIELD

The present invention relates to a thermoplastic adhesive film.

BACKGROUND ART

In the case where a molded article composed of a resin having a relatively low melting point or softening point, such as a polyolefin, is bonded to another member, an adhesive, which needs to be heated at the time of bonding, such as a hot melt type adhesive, has not been used ordinarily. This is because there is a possibility that due to heating temperature at the time of bonding the molded article composed of a polyolefin resin or the like is softened to be deformed. Furthermore, in the case where a member to be bonded is heavy, there is also a possibility that the hot melt type adhesive cannot be sufficiently solidified because of insufficient cooling after heat bonding and consequently, the member is peeled off due to failing to withstand the weight of the member.

Therefore, such a molded article has been bonded by using a solution type or reaction type adhesive, or bonding or pressure-sensitive adhesion thereof has been performed by daringly adopting a means such as welding or a pressure-sensitive adhesive.

Also, it has been known: a film adhesive for heating to be bonded only using a polyolefin, as described in Patent Document 1; forming a layer composed of an acid-modified polyolefin resin as a primer layer and forming thereon an adhesive layer composed of an olefin elastomer resin, as described in Patent Document 2; and a layer containing an ethylene polymer, an α-olefin crystalline polymer, a block copolymer, and maleic acid-grafted polypropylene, functioning as an adhesive layer between a polyolefin layer and a barrier layer, as described in Patent Document 3.

PRIOR ART DOCUMENT

Patent Document

Patent Document 1: JP-T-2000-512683
Patent Document 2: JP-A-2014-69516
Patent Document 3: JP-T-2015-531324

SUMMARY OF THE INVENTION

Problems that the Invention is to Solve

In the case of using a hot melt adhesive having a normal softening point, since heating temperature is relatively high, when a polyolefin resin molded article is bonded, there is a possibility that the polyolefin resin molded article is also softened to be deformed.

Furthermore, in the case of forming an acid-modified polyolefin resin as a primer layer, it is necessary to finally form a bonding layer composed of two or more layers including an adhesive layer.

Moreover, in order to form an adhesive film containing only an acid-modified polypropylene or containing a polyolefin resin, it is necessary to bond at a high temperature by using a means such as a co-extrusion together with an article to be bonded.

Means for Solving the Problems

As a result of the intensive investigations to solve the problems described above, the inventors have found that the problems can be solved by the means described below, to thereby complete the present invention.

1. A thermoplastic adhesive film containing a resin composition (D) containing a thermoplastic olefin elastomer resin (A), an acid-modified polypropylene resin (B) and a crystal nucleating agent (C).
2. The thermoplastic adhesive film according to 1, in which the resin composition (D) has a viscosity increase initiation temperature T1 when being cooled from a molten state of 180° C. at a strain of 1%, a share rate of 100 s$^{-1}$ and a rate of 3° C./min and a softening initiation temperature T2 when being pulled at a strain of 1% and a temperature rising rate of 10° C./min while applying oscillation having a frequency from 1 to 100 Hz, satisfying the following Equation (1):

$$(T1/T2) \geq 0.90 \qquad \text{Equation (1).}$$

3. The thermoplastic adhesive film according to 1 or 2, in which the resin composition (D) has a complex viscosity at 150° C., a strain of 1% and a shear rate of 100 s$^{-1}$ being 600 Pa·s or more and 10,000 Pa·s or less, and a complex viscosity at 120° C., a strain of 1% and a shear rate of 100 s$^{-1}$ being 4,000 Pa·s or more, when being cooled from a molten state of 180° C. at a strain of 1%, a share rate of 100 s$^{-1}$ and a rate of 3° C./min.
4. The thermoplastic adhesive film according to any one of 1 to 3, in which the resin composition (D) has a fusion enthalpy measured by a differential scanning calorimeter being 135 J/g or less.
5. The thermoplastic adhesive film according to any one of 1 to 4, in which the resin composition (D) contains a polypropylene resin (E).
6. The thermoplastic adhesive film according to any one of 1 to 5, satisfying a weight ratio [(A)/(E)] of the thermoplastic olefin elastomer resin (A) and the polypropylene resin (E) being from 100/0 to 10/90 (provided that (A)+(E)=100), and containing the acid-modified polypropylene resin (B) in an amount of from 20 to 500 parts by weight relative to 100 parts by weight of a total weight of (A) and (E).
7. The thermoplastic adhesive film according to any one of 1 to 6, in which the acid-modified polypropylene resin (B) is obtained by copolymerizing an unsaturated acid anhydride with a random copolymer polypropylene.
8. The thermoplastic adhesive film according to any one of 1 to 7, in which the resin composition (D) contains a near-infrared absorbing material.
9. The thermoplastic adhesive film according to any one of 1 to 8, in which the resin composition (D) contains an inorganic filler.
10. The thermoplastic adhesive film according to any one of 1 to 9, in which the resin composition (D) forms at least one surface layer of a multilayer film or sheet.
11. A bonding method of bonding a polypropylene resin adherend by using the thermoplastic adhesive film described in any one of 1 to 10, while controlling a bonding temperature that is a heating temperature to satisfy the following Equation (2):

(Melting temperature of adherend)>(Bonding temperature)≥(Melting temperature of acid-modified polypropylene resin (*B*))−20  Equation (2), in which the melting temperatures are numerical values measured by a differential scanning calorimeter.

12. A bonded body obtained by bonding two adherends each other by using the thermoplastic adhesive film described in any one of 1 to 10, in which at least one of the two adherends contains a polypropylene resin material or a polyamide resin material.

Advantageous Effect of the Invention

The thermoplastic adhesive film of the present invention makes it possible to bond a polypropylene resin material or a polyamide resin material at a temperature not more than a deformation temperature of the resin material, and also makes it possible to bond different materials to each other having properties different from that of the resin material, such as a metal material.

Furthermore, in a step of bonding an adherend, peeling due to poor solidification based on thermal history at heat bonding can be suppressed, and polypropylene resin materials or polyamide resin materials can be surely integrated with each other, or adherends of different materials such as the resin material and a metal material can be surely integrated with each other.

MODE FOR CARRYING OUT THE INVENTION

The thermoplastic adhesive film of the invention is characterized by containing a resin composition (D) containing a thermoplastic olefin elastomer resin (A), an acid-modified polypropylene resin (B) and a crystal nucleating agent (C). The resin composition (D) has a ratio (T1/T2) of a viscosity increase initiation temperature T1 when being cooled from a molten state of 180° C. at a strain of 1%, a share rate of 100 s$^{-1}$ and a rate of 3° C./min and a softening initiation temperature T2 when being pulled at a strain of 1% and a temperature rising rate of 10° C./min while applying oscillation having a frequency from 1 to 100 Hz, being preferably 0.90 or more, and more preferably 0.97 or more and 1.05 or less. In the case where the ratio is less than 0.90, there is a possibility that sufficient solidification cannot be achieved in a cooling step after heat bonding and peeling of the adherend may occur.

In the thermoplastic adhesive film of the present invention, the resin composition (D) has a complex viscosity at 150° C., a strain of 1% and a shear rate of 100 s-1 being preferably 600 Pa·s or more and 10,000 Pa·s or less when being cooled from a molten state of 180° C. at a strain of 1%, a share rate of 100 s-1 and a rate of 3° C./min. The complex viscosity at 150° C., a strain of 1% and a shear rate of 100 s-1 is more preferably 1,000 Pa·s or more and 9,400 Pa·s or less, and most preferably 1,200 Pa·s or more and 5,000 Pa·s or less. In the case where the complex viscosity at 150° C., a strain of 1% and a shear rate of 100 s-1 is less than 600 Pa·s, a sufficient bonding strength may not be obtained in some cases because of protruding from an adherend at the time of heat bonding due to too low melt viscosity. In the case where the complex viscosity at 150° C., a strain of 1% and a shear rate of 100 s-1 exceeds 10,000 Pa·s, a sufficient bonding strength may not be obtained in some cases because wetting on an adherend may be degraded due to too high melt viscosity.

On the other hand, a complex viscosity at 120° C., a strain of 1% and a shear rate of 100 s-1 is preferably 4,000 Pa·s or more, and more preferably 10,000 or more and 40,000 Pa·s or less. In the case where the complex viscosity at 120° C., a strain of 1% and a shear rate of 100 s-1 is less than 4,000 Pa·s, peeling of an adherend may occur because of low melt viscosity at the time of cooling after heat bonding.

In order to enable bonding at temperature lower than the deformation temperature of a polypropylene resin material or a polyamide resin material, it is necessary to control crystallinity of the thermoplastic adhesive film. Accordingly, the resin composition (D) has a fusion enthalpy measured by a differential scanning calorimeter being preferably 135 J/g or less, more preferably 100 J/g or less, and still more preferably 40 J/g or less. In the case where the fusion enthalpy exceeds 135 J/g, a sufficient bonding strength may not be obtained at temperature lower than the melting temperature of a polypropylene resin material or a polyamide resin material.

Materials constituting the thermoplastic adhesive film of the present invention are described below.

(Thermoplastic Olefin Elastomer Resin (A))

The thermoplastic olefin elastomer resin (A) used in the present invention preferably has a fusion enthalpy measured by a differential scanning calorimeter of 35 J/g or less.

The thermoplastic olefin elastomer resin (A) includes, for example, those in which in a hard segment of homo or random polypropylene is dispersed as a soft segment, uncrosslinked or partially crosslinked ethylene-propylene rubber or ethylene-propylene-diene rubber at the time of polymerization of the hard segment (reactor type); those in which a hard segment of homo or random polypropylene and a soft segment of uncrosslinked or partially crosslinked ethylene-propylene rubber or ethylene-propylene-diene rubber are dynamically crosslinked at the time of kneading; a propylene-butene copolymer; a propylene-ethylene-butene copolymer; a propylene-butadiene copolymer; a propylene-ethylene-butadiene copolymer, syndiotactic polypropylene; and an α-olefin copolymer. Examples of the thermoplastic olefin elastomer resin include PRIME TPOs produced by Prime Polymer Co., Ltd. and THERMORUNs produced by Mitsubishi Chemical Corp.

The blending amount of the thermoplastic olefin elastomer resin (A) may be from 1.5 to 90 parts by weight, preferably from 10 to 70 parts by weight, more preferably from 20 to 50 parts by weight in 100 parts by weight of the resin composition (D). In the case where the blending amount is other than 1.5 to 90 parts by weight, bonding force may decrease.

(Acid-Modified Polypropylene Resin (B))

The acid-modified polypropylene resin (B) used in the present invention includes a copolymer of propylene or propylene-ethylene with an unsaturated carboxylic acid such as maleic anhydride, itaconic acid, fumaric acid, oleic acid, acrylic acid, or methacrylic acid, and is preferably a copolymer of propylene-ethylene with maleic anhydride. Examples of the acid-modified polypropylene resin (B) include FUSABONDs produced by DuPont and UMEXs produced by Sanyo Chemical Industries, Ltd.

The blending amount of the acid-modified polypropylene resin (B) is preferably from 20 to 500 parts by weight and more preferably from 50 to 300 parts by weight, relative to 100 parts by weight of the thermoplastic olefin elastomer resin (A) or the total amount of the thermoplastic olefin elastomer resin (A) and the polypropylene resin (E). In the case where the blending amount is less than 20 parts by weight, bonding force may decrease.

(Crystal Nucleating Agent (C))

As the crystal nucleating agent (C) used in the present invention, known agents effective for polypropylene can be used, and examples thereof includes a dibenzylidene sorbitol derivative, a phosphate metal salt, a benzoic acid metal salt, a pimelic acid metal salt, a rosin metal salt, quinacridone, cyanine blue, talc, and calcium carbonate. The addition amount thereof is preferably from 0.01 to 1 part by weight in 100 parts by weight of the resin composition (D). In the case where the addition amount is other than 0.01 to 1 part by weight, bonding force may decrease. Examples of the crystal nucleating agent include GEL ALLs produced by New Japan Chemical Co., Ltd. and ADK STABs produced by ADEKA Corp.

In the thermoplastic adhesive film of the present invention, the resin composition (D) can contain a polypropylene resin (E). The polypropylene resin (E) may be either of homo or random thereof. Examples of the polypropylene resin include SUMITOMO NOBLENs produced by Sumitomo Chemical Co., Ltd. and NOVATEC-PPs produced by Japan Polypropylene Corp.

In the case where the thermoplastic adhesive film of the present invention contains the polypropylene resin (E), a weight ratio [(A)/(E)] of the thermoplastic olefin elastomer resin (A) and the polypropylene resin (E) is preferably from 100/0 to 10/90 (provided that (A)+(E)=100), and more preferably from 90/10 to 20/80. In the case where the ratio described above is satisfied, higher bonding strength can be obtained at temperature lower than the melting temperature of a polypropylene resin material or a polyamide resin material. Furthermore, when the total weight of (A) and (E) is taken as 100 parts by weight, the content of the acid-modified polypropylene resin (B) is preferably from 20 to 500 parts by weight. In the range described above, higher bonding strength to a metal material can be obtained.

In the thermoplastic adhesive film of the present invention, the resin composition (D) can contain an infrared absorbing material such as carbon black, graphene, graphite, a diimmonium salt, an aminium salt, a cyanine compound, a phthalocyanine compound, a dithiol metal complex, a naphthoquinone compound, an azo compound, and talc. As a result, it allows bonding by heating with irradiation of infrared ray such as laser light.

For the purpose of increasing rigidity of the thermoplastic adhesive film of the present invention, the resin composition (D) can contain an inorganic filler such as talc, calcium carbonate, sepiolite, boehmite, bentonite, silica, mica, titanium oxide, zinc oxide, glass beads, and a metal fiber of aluminum, nickel, copper or the like.

To the thermoplastic adhesive film of the present invention, a tackifier may or may not be added, and in the case where the tackiness is not required, the tackifier may not be added. Furthermore, various crosslinking agents and plasticizers may or may not be added.

It is possible to form a multilayer film or multilayer sheet by providing a base material layer on one surface of the thermoplastic adhesive film composed of the resin composition (D) of the invention.

The base material layer is employed for the purpose of adjusting physical properties such as bending strength, stiffness or heat resistance, or thickness of the thermoplastic adhesive film of the present invention, and use can be made of a polypropylene resin, a polyethylene terephthalate resin and a polyamide resin.

(Production Method)

The thermoplastic adhesive film of the present invention can be obtained by a known melt extrusion molding, and the resin composition (D) is extruded through a T-die, a circular die or the like and cooled to solidify, whereby a film or sheet can be formed. Furthermore, for the purpose of improving surface wettability of the thermoplastic adhesive film, the surface of the thermoplastic adhesive film can be subjected to a corona discharge treatment, a plasma discharge treatment, a UV/ozone treatment, or a flame treatment.

(Bonding Method)

In the case where the adherends are thermoplastic resins such as a polypropylene resin, the thermoplastic adhesive film of the present invention can bond the adherends with suppressing deformation of the adherends by controlling the bonding temperature, which is the heating temperature at a time of the bonding, to satisfy: (Melting temperature of thermoplastic resin)>(Bonding temperature)≥(Melting temperature of acid-modified polypropylene resin)−20 (here, the melting temperatures are numerical values measured by a differential scanning calorimeter).

(Application)

Applications of the thermoplastic adhesive film of the present invention are not particularly limited, and it is used for applications in which two adherends are bonded to each other to obtain a bonded body.

The adherend can be selected from those made of any materials such as rein, wood, metal, paper, glass, pottery, ceramics, woven fabric, and non-woven fabric.

Among them, at least one of the materials of the two adherends is preferably a resin. In the case where both of two materials are resins, any combination of various thermoplastic resins with each other, various heat or energy-ray curable resins with each other and a thermoplastic resin with a heat or energy-ray curable resin may be used. In particular, at least one of the two adherends can be a polypropylene resin material or a polyamide resin material. In the case where one of the adherends is a resin, the resin may be any of a thermoplastic resin and a heat or energy-ray curable resin.

Furthermore, the thermoplastic adhesive film of the present invention can be used as an adhesive material for making molded products for various applications, for example, automotive interior goods, footwear such as shoes and sandals, furniture, smart phone, tablet terminal or PC housing, or home electronics housing.

EXAMPLE

The present invention will be described in more details with reference to Examples.

Examples show one mode of the present invention and the present invention should not be construed as being limited thereto.

Examples 1 to 4

The total weight of a thermoplastic olefin elastomer resin (TPO1) (PRIME TPO R110E produced by Prime Polymer Co., Ltd., fusion enthalpy: 6 J/g) and an acid-modified polypropylene resin (MPP1) (FUSABONDO DPA 50E806 produced by DuPont, melting temperature: 140° C., random PP) in a ratio as shown in Table 1 was taken as 100 parts by weight, and thereto was mixed 0.2 parts by weight of a crystal nucleating agent (C1) (ADK STAB NA-21 produced by ADEKA Corp., phosphate metal salt) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Examples 5 to 7

The total weight of a thermoplastic olefin elastomer resin (TPO1) and an acid-modified polypropylene resin (MPP2) (Admer QE060 produced by Mitsui Chemicals Inc., melting temperature: 140° C., random PP) in a ratio as shown in Table 1 was taken as 100 parts by weight, and thereto was mixed 0.2 parts by weight of a crystal nucleating agent (C2) (GEL ALL D produced by New Japan Chemical Co., Ltd., dibenzylidene sorbitol derivative) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Examples 8 to 13

The total weight of a thermoplastic olefin elastomer resin (TPO2) (THERMORUN 3707N produced by Mitsubishi Chemical Corp., fusion enthalpy. 34 J/g), an acid-modified polypropylene resin (MPP1) and a polypropylene resin (PP1) (NOBLEN S131 produced by Sumitomo Chemical Co., Ltd., random PP) in a ratio as shown in Table 1 was taken as 100 parts by weight, and thereto was mixed 0.2 parts by weight of a crystal nucleating agent (C1) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Examples 14 to 19

The total weight of a thermoplastic olefin elastomer resin (TPO2), an acid-modified polypropylene resin (MPP1) and a polypropylene resin (PP2) (NOVATEC EA9 produced by Japan Polypropylene Corp., homo PP) in a ratio as shown in Table 1 was taken as 100 parts by weight, and thereto was mixed 0.05 parts by weight of a crystal nucleating agent (C2) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Examples 20 to 25

The total weight of a thermoplastic olefin elastomer resin (TPO1), an acid-modified polypropylene resin (MPP1) and a polypropylene resin (PP1) (NOBLEN S131 produced by Sumitomo Chemical Co., Ltd., random PP) in a ratio as shown in Table 1 was taken as 100 parts by weight, and thereto was mixed 0.2 parts by weight of a crystal nucleating agent (C1) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Examples 26 to 31

The total weight of a thermoplastic olefin elastomer resin (TPO1), an acid-modified polypropylene resin (MPP1) and a polypropylene resin (PP1) (NOBLEN S131 produced by Sumitomo Chemical Co., Ltd., random PP) in a ratio as shown in Table 1 was taken as 100 parts by weight, and thereto was mixed 0.8 parts by weight of a crystal nucleating agent (C1) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Examples 32 to 37

The total weight of a thermoplastic olefin elastomer resin (TPO1), an acid-modified polypropylene resin (MPP1) and a polypropylene resin (PP2) (NOVATEC EA9 produced by Japan Polypropylene Corp., homo PP) in a ratio as shown in Table 1 was taken as 100 parts by weight, and thereto was mixed 0.2 parts by weight of a crystal nucleating agent (C2) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Example 38

The total weight of a thermoplastic olefin elastomer resin (TPO1), an acid-modified polypropylene resin (MPP1) and a polypropylene resin (PP1) in a ratio as shown in Table 1 was taken as 100 parts by weight, and thereto were mixed 0.2 parts by weight of a crystal nucleating agent (C1) and 0.5 parts by weight of carbon black CB (ASAHI #15HS produced by Asahi Carbon Co., Ltd.) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Example 39

The total weight of a thermoplastic olefin elastomer resin (TPO1), an acid-modified polypropylene resin (MPP1) and a polypropylene resin (PP1) in a ratio as shown in Table 1 was taken as 100 parts by weight, and thereto were mixed 0.2 parts by weight of a crystal nucleating agent (C1) and 10 parts by weight of talc (SOAPSTONE A produced by Imerys Specialities Japan Co., Ltd.) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Example 40

A polyamide resin (PA1) (ULTRAMID B4, PA6 produced by BASF) was subjected to melt pressing by a hot plate pressing machine (produced by Shinto Metal Industries, Ltd.) at 300° C. and 10 MPa to obtain Film 1. Separately, the total weight of a thermoplastic olefin elastomer resin (TPO1), an acid-modified polypropylene resin (MPP3) (MODIC P502 produced by Mitsubishi Chemical Corp., melting temperature: 165° C., homo PP) and a polypropylene resin (PP1) (50 parts by weight of MPP3 to 100 parts by weight of TPO1/PP1=50/50) was taken as 100 parts by weight, and thereto was mixed 0.2 parts by weight of a crystal nucleating agent (C1) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by the hot plate pressing machine (produced by Shinto Metal Industries, Ltd.) at 200° C. and 10 MPa to obtain Film 2. Film 1 and Film 2 were subjected to melt pressing by the hot plate pressing machine at 170° C. and 10 MPa so as to be Film 1/Film 2=2/1, thereby obtaining a multilayer film having a thickness of 80 µm.

Comparative Example 1

A thermoplastic olefin elastomer resin (TPO1) and a polypropylene resin (PP1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa, to thereby obtain a thermoplastic adhesive film having a thickness of 80 µm.

Comparative Example 2

One hundred parts by weight of an acid-modified polypropylene resin (MPP1) and 0.2 parts by weight of a crystal nucleating agent (C1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Comparative Example 3

One hundred parts by weight of an acid-modified polypropylene resin (MPP2) (ADMER QE060 produced by Mitsui Chemicals Inc.) and 0.2 parts by weight of a crystal nucleating agent (C1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Comparative Examples 4 and 8

The total weight of a polypropylene resin (PP2) and an acid-modified polypropylene resin (MPP1) in a ratio as shown in Table 1 was taken as 100 parts by weight, and thereto was mixed 0.2 parts by weight of a crystal nucleating agent (C2) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Comparative Examples 5 to 7

The total weight of a polypropylene resin (PP1) and an acid-modified polypropylene resin (MPP1) in a ratio as shown in Table 1 was taken as 100 parts by weight, and thereto was mixed 0.2 parts by weight of a crystal nucleating agent (C2) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Comparative Example 9

An acid-modified polypropylene resin (MPP1) in a ratio as shown in Table 1 was mixed and kneaded by a Labo Plastomill (produced by Toyo Seiki Seisaku-sho Ltd.) at 200° C. and 50 rpm for 5 minutes to prepare a resin composition, and the resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Comparative Example 10

An acid-modified polypropylene resin (MPP2) in a ratio as shown in Table 1 was mixed and kneaded by a Labo Plastomill (produced by Toyo Seiki Seisaku-sho Ltd.) at 200° C. and 50 rpm for 5 minutes to prepare a resin composition, and the resulting resin composition was subjected to melt pressing by a hot plate pressing machine (produced by Shinto Metal Industries, Ltd.) at 200° C. and 10 MPa to obtain a thermoplastic adhesive film having a thickness of 80 µm.

Comparative Example 11

A polypropylene resin (PP1) and an acid-modified polypropylene resin (MPP1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Comparative Example 12

A polypropylene resin (PP2) and an acid-modified polypropylene resin (MPP1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Comparative Example 13

A polypropylene resin (PP2), a thermoplastic olefin elastomer resin (TPO1) and an acid-modified polypropylene resin (MPP1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Comparative Examples 14 to 16

A polypropylene resin (PP1), a thermoplastic olefin elastomer resin (TPO1) and an acid-modified polypropylene resin (MPP1) in a ratio as shown in Table 1 were mixed and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by a hot plate pressing machine (produced by Shinto Metal Industries, Ltd.) at 200° C. and 10 MPa to obtain a thermoplastic adhesive film having a thickness of 80 μm.

Comparative Example 17

A polyamide resin (PA1) was subjected to melt pressing by a hot plate pressing machine (produced by Shinto Metal Industries, Ltd.) at 3000° C. and 10 MPa to obtain Film 1. Separately, the total weight of a thermoplastic olefin elastomer resin (TPO1) and a polypropylene resin (PP1) was taken as 100 parts by weight, and thereto was mixed 0.2 parts by weight of a crystal nucleating agent (C1) and kneaded by a Labo Plastomill (produced by Toyo Seiki Seisaku-sho Ltd.) at 200° C. and 50 rpm for 5 minutes, to thereby prepare a resin composition. The resulting resin composition was subjected to melt pressing by the hot plate pressing machine (produced by Shinto Metal Industries, Ltd.) at 200° C. and 10 MPa to obtain Film 2. Film 1 and Film 2 were subjected to melt pressing by the hot plate pressing machine at 170° C. and 10 MPa so as to be Film 1/Film 2=2/1, thereby obtaining a multilayer film having a thickness of 80 μm.

TABLE 1

| Sample | Thermoplastic Olefin Elastomer Resin (A)/ Polyolefin Resin (E) = 100 wt. part | Acid-modified Polypropylene Resin (B) | Crystal Nucleating Agent (C) and Other Additives |
|---|---|---|---|
| Ex. 1 | TPO1 (100) | MPP1 (20 wt. part) | C1 (0.2 wt. part) |
| Ex. 2 | TPO1 (100) | MPP1 (50 wt. part) | C1 (0.2 wt. part) |
| Ex. 3 | TPO1 (100) | MPP1 (70 wt. part) | C1 (0.2 wt. part) |
| Ex. 4 | TPO1 (100) | MPP1 (100 wt. part) | C1 (0.2 wt. part) |
| Ex. 5 | TPO1 (100) | MPP2 (150 wt. part) | C2 (0.2 wt. part) |
| Ex. 6 | TPO1 (100) | MPP2 (250 wt. part) | C2 (0.2 wt. part) |
| Ex. 7 | TPO1 (100) | MPP2 (400 wt. part) | C2 (0.2 wt. part) |
| Ex. 8 | TPO2 (90)/PP1 (10) | MPP1 (20 wt. part) | C1 (0.2 wt. part) |
| Ex. 9 | TPO2 (90)/PP1 (10) | MPP1 (50 wt. part) | C1 (0.2 wt. part) |
| Ex. 10 | TPO2 (90)/PP1 (10) | MPP1 (70 wt. part) | C1 (0.2 wt. part) |
| Ex. 11 | TPO2 (90)/PP1 (10) | MPP1 (100 wt. part) | C1 (0.2 wt. part) |
| Ex. 12 | TPO2 (90)/PP1 (10) | MPP1 (250 wt. part) | C1 (0.2 wt. part) |
| Ex. 13 | TPO2 (90)/PP1 (10) | MPP1 (400 wt. part) | C1 (0.2 wt. part) |
| Ex. 14 | TPO2 (70)/PP2 (30) | MPP1 (20 wt. part) | C2 (0.05 wt. part) |
| Ex. 15 | TPO2 (70)/PP2 (30) | MPP1 (50 wt. part) | C2 (0.05 wt. part) |
| Ex. 16 | TPO2 (70)/PP2 (30) | MPP1 (70 wt. part) | C2 (0.05 wt. part) |
| Ex. 17 | TPO2 (70)/PP2 (30) | MPP1 (100 wt. part) | C2 (0.05 wt. part) |
| Ex. 18 | TPO2 (70)/PP2 (30) | MPP1 (250 wt. part) | C2 (0.05 wt. part) |
| Ex. 19 | TPO2 (70)/PP2 (30) | MPP1 (400 wt. part) | C2 (0.05 wt. part) |
| Ex. 20 | TPO1 (50)/PP1 (50) | MPP1 (20 wt. part) | C1 (0.2 wt. part) |
| Ex. 21 | TPO1 (50)/PP1 (50) | MPP1 (50 wt. part) | C1 (0.2 wt. part) |
| Ex. 22 | TPO1 (50)/PP1 (50) | MPP1 (70 wt. part) | C1 (0.2 wt. part) |
| Ex. 23 | TPO1 (50)/PP1 (50) | MPP1 (100 wt. part) | C1 (0.2 wt. part) |
| Ex. 24 | TPO1 (50)/PP1 (50) | MPP1 (250 wt. part) | C1 (0.2 wt. part) |
| Ex. 25 | TPO1 (50)/PP1 (50) | MPP1 (400 wt. part) | C1 (0.2 wt. part) |
| Ex. 26 | TPO1 (30)/PP1 (70) | MPP1 (20 wt. part) | C1 (0.8 wt. part) |
| Ex. 27 | TPO1 (30)/PP1 (70) | MPP1 (50 wt. part) | C1 (0.8 wt. part) |
| Ex. 28 | TPO1 (30)/PP1 (70) | MPP1 (70 wt. part) | C1 (0.8 wt. part) |
| Ex. 29 | TPO1 (30)/PP1 (70) | MPP1 (100 wt. part) | C1 (0.8 wt. part) |
| Ex. 30 | TPO1 (30)/PP1 (70) | MPP1 (250 wt. part) | C1 (0.8 wt. part) |
| Ex. 31 | TPO1 (30)/PP1 (70) | MPP1 (400 wt. part) | C1 (0.8 wt. part) |
| Ex. 32 | TPO1 (10)/PP2 (90) | MPP1 (20 wt. part) | C2 (0.2 wt. part) |
| Ex. 33 | TPO1 (10)/PP2 (90) | MPP1 (50 wt. part) | C2 (0.2 wt. part) |
| Ex. 34 | TPO1 (10)/PP2 (90) | MPP1 (70 wt. part) | C2 (0.2 wt. part) |
| Ex. 35 | TPO1 (10)/PP2 (90) | MPP1 (100 wt. part) | C2 (0.2 wt. part) |
| Ex. 36 | TPO1 (10)/PP2 (90) | MPP1 (250 wt. part) | C2 (0.2 wt. part) |

TABLE 1-continued

| Sample | Thermoplastic Olefin Elastomer Resin (A)/ Polyolefin Resin (E) = 100 wt. part | Acid-modified Polypropylene Resin (B) | Crystal Nucleating Agent (C) and Other Additives |
|---|---|---|---|
| Ex. 37 | TPO1 (10)/PP2 (90) | MPP1 (400 wt. part) | C2 (0.2 wt. part) |
| Ex. 38 | TPO1 (50)/PP1 (50) | MPP1 (50 wt. part) | C1 (0.2 wt. part) CB 0.5 wt. part |
| Ex. 39 | TPO1 (50)/PP1 (50) | MPP1 (50 wt. part) | C1 (0.2 wt. part) Talc 10 wt. part |
| Ex. 40 | Film 1: PA1 (100) Film 2: TPO1 (50)/PP1 (50)/MPP 3 (50 wt. part) Film 1/Film 2 = 2/1 | | Film 2 C1 (0.2 wt. part) |
| Comp. Ex. 1 | TPO1 (50)/PP1 (50) | None | No Crystal Nucleating Agent |
| Comp. Ex. 2 | None | MPP1 (100 wt. part) | C1 (0.2 wt. part) |
| Comp. Ex. 3 | None | MPP2 (100 wt. part) | C1 (0.2 wt. part) |
| Comp. Ex. 4 | PP2 (100) | MPP1 (20 wt. part) | C2 (0.2 wt. part) |
| Comp. Ex. 5 | PP1 (100) | MPP1 (50 wt. part) | C2 (0.2 wt. part) |
| Comp. Ex. 6 | PP1 (100) | MPP1 (100 wt. part) | C2 (0.2 wt. part) |
| Comp. Ex. 7 | PP1 (100) | MPP1 (400 wt. part) | C2 (0.2 wt. part) |
| Comp. Ex. 8 | PP2 (100) | MPP1 (400 wt. part) | C2 (0.2 wt. part) |
| Comp. Ex. 9 | None | MPP1 (100 wt. part) | No Crystal Nucleating Agent |
| Comp. Ex. 10 | None | MPP2 (100 wt. part) | No Crystal Nucleating Agent |
| Comp. Ex. 11 | PP1 (100) | MPP1 (50 wt. part) | No Crystal Nucleating Agent |
| Comp. Ex. 12 | PP2 (100) | MPP1 (400 wt. part) | No Crystal Nucleating Agent |
| Comp. Ex. 13 | TPO1 (70)/PP2 (30) | MPP1 (50 wt. part) | No Crystal Nucleating Agent |
| Comp. Ex. 14 | TPO1 (50)/PP1 (50) | MPP1 (50 wt. part) | No Crystal Nucleating Agent |
| Comp. Ex. 15 | TPO1 (30)/PP1 (70) | MPP1 (50 wt. part) | No Crystal Nucleating Agent |
| Comp. Ex. 16 | TPO1 (50)/PP1 (50) | MPP1 (400 wt. part) | No Crystal Nucleating Agent |
| Comp. Ex. 17 | Film 1: PA1 (100) Film 2: TPO1 (50)/PP1 (50) Film 1/Film 2 = 2/1 | | Film 2 C1 (0.2 wt. part) |

<Viscosity Increase Initiation Temperature Measurement>

Figure 1:
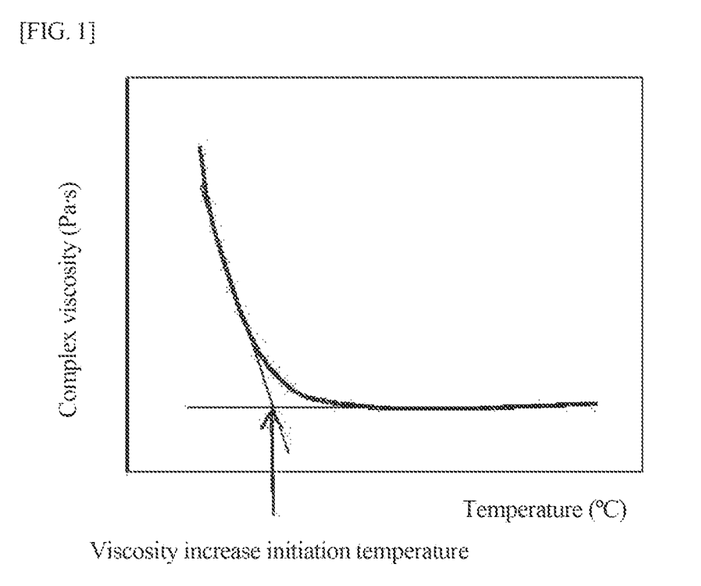
FIG. 1 It is a diagram showing a viscosity increase initiation temperature (T1).

For each sample of Examples 1 to 40 and Comparative Examples 1 to 17, complex viscosity was measured at the time of cooling from an initiation temperature of 180° C. to 100° C. under conditions of a stain of 1%, a shear rate of 100 s$^{-1}$ and a cooling rate of 3° C./min by using a viscoelasticity measuring apparatus (produced by Anton Paar Co.). A point at which the complex viscosity increased rapidly was taken as the viscosity increase initiation temperature (T1) (FIG. 1).

<Softening Initiation Temperature Measurement>

Figure 2:
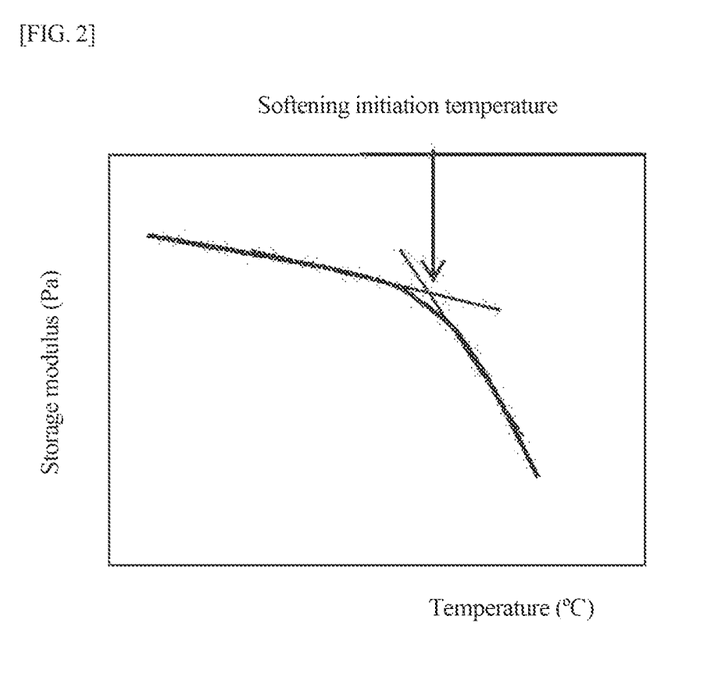
FIG. 2 It is a diagram showing a softening initiation temperature (T2).

For each sample of Examples 1 to 40 and Comparative Examples 1 to 17, storage modulus was measured by setting an initiation temperature to 25° C. under conditions of a stain of 1%, a frequency of 1 and 100 Hz and a temperature rising rate of 10° C./min by using a dynamic viscoelasticity measuring apparatus (produced by IT Keisoku Seigyo Co., Ltd.). A point at which the storage modulus decreased rapidly was taken as the softening initiation temperature (T2) (FIG. 2).

<Complex Viscosity Measurement>

For each sample of Examples 1 to 40 and Comparative Examples 1 to 17, complex viscosities at 120° C. and 150° C. were measured by setting an initiation temperature to 180° C. under conditions of a stain of 1%, a shear rate of 100 s$^{-1}$ and a cooling rate of 3° C./min by using a viscoelasticity measuring apparatus (produced by Anton Paar Co.).

<Differential Scanning Calorimeter>

For each sample of Examples 1 to 40, Comparative Examples 1 to 17 and the thermoplastic olefin elastomer resins (TPO1 and TPO2), temperature rising-cooling-temperature re-rising was performed under conditions of a temperature rising rate of 10° C./min and a cooling rate of 10° C./min by using a differential scanning calorimeter (produced by TA Instruments), and fusion enthalpy was determined from an area of endothermic peak at the temperature re-rising. Furthermore, for the acid-modified polypropylene material (MPP1, MPP2 and MPP3), melting temperature was determined from an endothermic peak at the temperature re-rising under the conditions described above.

<Bonding Peeling Test>

Referring to the test piece production method of JIS K 6850, for each of Examples 1 to 39 and Comparative Examples 1 to 16, the sample was inserted between an electrogalvanized steel sheet (SEHC) having a thickness of 1.6 mm and a width of 20 mm and a polypropylene plate (PP) having a thickness of 3 mm and a width of 20 mm, bonding was performed under conditions of a pressing temperature of 150° C., a pressing load of 0.27 kN, a pressing time of 120 s, and bonding areas of 70 mm$^2$ and 40 mm$^2$ by using a hot plate pressing machine (produced by Shinto Metal Industries, Ltd.), to thereby produce a test piece. For Example 40 and Comparative Example 17, the sample was bonded so as to contact the Film 2 side with the SEHC under the conditions described above to produce a test piece. After 30 s of releasing the load, the test piece was placed the SEHC side down, and reciprocating up-and-down motion in moving distance of 50 mm was performed to observe peeling between the SEHC and PP due to own weight.

Good: Not peeling in 10 times or less reciprocating up-and-down motion

Poor Peeling in 10 times or less reciprocating up-and-down motion

<Bonding Strength Measurement 1>

Tensile shear bonding strength was measured by referring to JIS K 6850. The detailed conditions are described below.

Adherend:

Polypropylene plate (PP) (3.0 mm thick, 20 mm wide, melting temperature 165° C.)

Polyamide 66 plate (PA66) (3.0 mm thick, 20 mm wide, melting temperature 265° C.)

Bonding Configuration:
1-1 PP/sample of Examples 1 to 39 and Comparative Examples 1 to 16/PP
1-2 PA66/sample of Example 40 and Comparative Example 17 (Film 2 side faced to PA66 side)
Bonding Method:
Bonding was performed at a pressing temperature of 130° C., 150° C. and 170° C., a pressing load of 0.27 kN, a pressing time of 120 s, and a bonding area of 150 mm2 by using a hot plate pressing machine (produced by Shinto Metal Industries, Ltd.).
Measurement:
After allowing to stand for one day under an environment of 23° C., the tensile shear bonding strength was evaluated when pulled at a rate of 500 mm2/min by a tensile tester (produced by Shimadzu Corp.).
Adhesiveness Evaluation
Bonding Configuration 1-1:
Good: Adherend destruction or thermoplastic adhesive film cohesive failure
Poor: Interfacial peeling
Bonding Configuration 1-2:
Good: Adherend destruction or thermoplastic adhesive film cohesive failure without interfacial peeling at Film 1/Film 2
Poor: Interfacial peeling at Film 1/Film 2 or interfacial peeling at thermoplastic adhesive film/PA66
Deformation Evaluation of Adherend
Bonding Configuration 1-1: Visual Observation of Deformation of PP
Good: No deformation
Poor: Deformation
Bonding Configuration 1-2: Visual Observation of Deformation on the Side of PA66 or Film 1
Good: No deformation
Poor: Deformation
<Bonding Strength Measurement 2>
Tensile shear bonding strength was measured by referring to JIS K 6850. The detailed conditions are described below.
Adherend:
Electrogalvanized steel sheet (SEHC) (1.6 mm thick, 20 mm wide)
Polypropylene plate (PP) (3.0 mm thick, 20 mm wide, melting temperature 165° C.)
Bonding Configuration:
2-1 SEHC/sample of Examples 1 to 39 and Comparative Examples 1 to 16/PP
2-2 SEHC/sample of Example 40 and Comparative Example 17 (Film 2 side faced to SEHC side)
Bonding Method:
Bonding was performed at a pressing temperature of 150° C., a pressing load of 0.27 kN, a pressing time of 120 s, and a bonding area of 150 mm2 by using a hot plate pressing machine (produced by Shinto Metal Industries, Ltd.).
Measurement:
After allowing to stand for one day under an environment of 23° C., the tensile shear bonding strength was evaluated when pulled at a rate of 500 mm2/min by a tensile tester (produced by Shimadzu Corp.).
Adhesiveness Evaluation
Bonding Configuration 2-1:
Good: Adherend destruction or thermoplastic adhesive film cohesive failure
Poor: Interfacial peeling
Bonding Configuration 2-2:
Good: Adherend destruction or thermoplastic adhesive film cohesive failure without interfacial peeling at Film 1/Film 2
Poor: Interfacial peeling at Film 1/Film 2 or interfacial peeling at thermoplastic adhesive film/SEHC
Deformation Evaluation of Adherend
Bonding Configuration 2-1: Visual Observation of Deformation of PP
Good: No deformation Poor: Deformation
Bonding Configuration 2-2: Visual Observation of Deformation on the Side of Film 1
Good: No deformation
Poor: Deformation Evaluation Results The evaluation results for each sample of Examples 1 to 40 and Comparative Examples 1 to 17 are shown in Table 2 and Table 3.

TABLE 2

| Sample | T1 (° C.) | T2 (° C.) | T1/T2 | Complex Viscosity (Pa · s) 150° C. | Complex Viscosity (Pa · s) 120° C. | Fusion Enthalpy (J/g) | Bonding Peeling Test Bonding Area (mm²) 70 | Bonding Peeling Test Bonding Area (mm²) 40 |
|---|---|---|---|---|---|---|---|---|
| Ex. 1 | 138 | 134 | 1.03 | 1800 | 18000 | 24 | Good | Good |
| Ex. 2 | 137 | 133 | 1.03 | 1800 | 18000 | 28 | Good | Good |
| Ex. 3 | 137 | 132 | 1.04 | 1700 | 17000 | 30 | Good | Good |
| Ex. 4 | 136 | 132 | 1.03 | 1600 | 15000 | 32 | Good | Good |
| Ex. 5 | 136 | 131 | 1.04 | 1500 | 13000 | 35 | Good | Good |
| Ex. 6 | 135 | 130 | 1.04 | 1400 | 12000 | 37 | Good | Good |
| Ex. 7 | 133 | 130 | 1.02 | 1500 | 10000 | 39 | Good | Good |
| Ex. 8 | 135 | 133 | 1.02 | 1600 | 17000 | 27 | Good | Good |
| Ex. 9 | 135 | 132 | 1.02 | 1600 | 17000 | 30 | Good | Good |
| Ex. 10 | 135 | 131 | 1.03 | 1700 | 15000 | 32 | Good | Good |
| Ex. 11 | 134 | 131 | 1.02 | 1700 | 16000 | 34 | Good | Good |
| Ex. 12 | 133 | 131 | 1.02 | 1800 | 15000 | 38 | Good | Good |
| Ex. 13 | 133 | 130 | 1.02 | 1800 | 14000 | 40 | Good | Good |
| Ex. 14 | 140 | 143 | 0.98 | 3900 | 28000 | 61 | Good | Good |
| Ex. 15 | 140 | 142 | 0.99 | 3200 | 27000 | 58 | Good | Good |
| Ex. 16 | 139 | 140 | 0.99 | 2900 | 25000 | 56 | Good | Good |
| Ex. 17 | 138 | 139 | 0.99 | 2600 | 25000 | 54 | Good | Good |
| Ex. 18 | 137 | 138 | 0.99 | 1800 | 20000 | 50 | Good | Good |
| Ex. 19 | 137 | 136 | 1.01 | 1500 | 27000 | 48 | Good | Good |
| Ex. 20 | 131 | 129 | 1.02 | 1800 | 17000 | 36 | Good | Good |

TABLE 2-continued

| Sample | T1 (° C.) | T2 (° C.) | T1/T2 | Complex Viscosity (Pa · s) 150° C. | Complex Viscosity (Pa · s) 120° C. | Fusion Enthalpy (J/g) | Bonding Peeling Test Bonding Area (mm²) 70 | Bonding Peeling Test Bonding Area (mm²) 40 |
|---|---|---|---|---|---|---|---|---|
| Ex. 21 | 131 | 129 | 1.02 | 1600 | 16000 | 38 | Good | Good |
| Ex. 22 | 130 | 129 | 1.01 | 1500 | 17000 | 39 | Good | Good |
| Ex. 23 | 130 | 128 | 1.02 | 1400 | 15000 | 40 | Good | Good |
| Ex. 24 | 130 | 128 | 1.02 | 1200 | 15000 | 41 | Good | Good |
| Ex. 25 | 130 | 128 | 1.02 | 1100 | 15000 | 42 | Good | Good |
| Ex. 26 | 131 | 128 | 1.02 | 1600 | 18000 | 41 | Good | Good |
| Ex. 27 | 130 | 128 | 1.02 | 1600 | 18000 | 42 | Good | Good |
| Ex. 28 | 130 | 128 | 1.02 | 1600 | 17000 | 42 | Good | Good |
| Ex. 29 | 130 | 127 | 1.02 | 1700 | 17000 | 42 | Good | Good |
| Ex. 30 | 130 | 127 | 1.02 | 1700 | 17000 | 43 | Good | Good |
| Ex. 31 | 130 | 127 | 1.02 | 1700 | 17000 | 43 | Good | Good |
| Ex. 32 | 149 | 148 | 1.01 | 3200 | 40000 | 134 | Good | Good |
| Ex. 33 | 148 | 147 | 1.01 | 7500 | 38000 | 116 | Good | Good |
| Ex. 34 | 148 | 147 | 1.01 | 6700 | 38000 | 108 | Good | Good |
| Ex. 35 | 147 | 146 | 1.01 | 5800 | 33000 | 98 | Good | Good |
| Ex. 36 | 147 | 143 | 1.03 | 3600 | 27000 | 75 | Good | Good |
| Ex. 37 | 145 | 140 | 1.04 | 2700 | 19000 | 66 | Good | Good |
| Ex. 38 | 132 | 129 | 1.02 | 1600 | 17000 | 40 | Good | Good |
| Ex. 39 | 133 | 129 | 1.03 | 1700 | 18000 | 45 | Good | Good |
| Ex. 40 | 140 | 130 | 1.07 | 2000 | 10000 | 75 | Good | Good |
| Comp. Ex. 1 | 105 | 121 | 0.87 | 1800 | 2400 | 36 | Poor | Poor |
| Comp. Ex. 2 | 110 | 126 | 0.87 | 710 | 1100 | 44 | Poor | Poor |
| Comp. Ex. 3 | 112 | 127 | 0.88 | 1300 | 3200 | 55 | Poor | Poor |
| Comp. Ex. 4 | 152 | 149 | 1.02 | 11000 | 40000 | 147 | Poor | Poor |
| Comp. Ex. 5 | 131 | 129 | 1.02 | 1300 | 17000 | 48 | Good | Poor |
| Comp. Ex. 6 | 129 | 128 | 1.01 | 1100 | 9000 | 47 | Good | Poor |
| Comp. Ex. 7 | 129 | 129 | 1.00 | 1000 | 3000 | 45 | Poor | Poor |
| Comp. Ex. 8 | 145 | 141 | 1.03 | 3000 | 18000 | 69 | Poor | Poor |
| Comp. Ex. 9 | 105 | 127 | 0.83 | 560 | 1000 | 44 | Poor | Poor |
| Comp. Ex. 10 | 106 | 128 | 0.83 | 1200 | 2000 | 44 | Poor | Poor |
| Comp. Ex. 11 | 108 | 121 | 0.89 | 1400 | 2100 | 48 | Poor | Poor |
| Comp. Ex. 12 | 120 | 140 | 0.86 | 900 | 1300 | 45 | Poor | Poor |
| Comp. Ex. 13 | 121 | 143 | 0.85 | 3100 | 3600 | 34 | Poor | Poor |
| Comp. Ex. 14 | 109 | 122 | 0.89 | 1600 | 2300 | 38 | Poor | Poor |
| Comp. Ex. 15 | 108 | 125 | 0.86 | 1600 | 2300 | 42 | Poor | Poor |
| Comp. Ex. 16 | 106 | 126 | 0.84 | 1100 | 1500 | 42 | Poor | Poor |
| Comp. Ex. 17 | 140 | 130 | 1.07 | 2200 | 12000 | 50 | Poor | Poor |

TABLE 3

| | Bonding Strength Measurement 1 | | | | | | Bonding Strength Measurement 2 | |
|---|---|---|---|---|---|---|---|---|
| | 130° C. | | 150° C. | | 170° C. | | 150° C. | |
| Sample | Adhesiveness | Deformation of Adherend | Adhesiveness | Deformation of Adherend | Adhesiveness | Deformation of Adherend | Adhesiveness | Deformation of Adherend |
| Ex. 1 | Good | Good | Good | Good | Good | Poor | Good | Good |
| Ex. 2 | Good | Good | Good | Good | Good | Poor | Good | Good |
| Ex. 3 | Good | Good | Good | Good | Good | Poor | Good | Good |
| Ex. 4 | Good | Good | Good | Good | Good | Poor | Good | Good |
| Ex. 5 | Good | Good | Good | Good | Good | Poor | Good | Good |
| Ex. 6 | Good | Good | Good | Good | Good | Poor | Good | Good |
| Ex. 7 | Good | Good | Good | Good | Good | Poor | Good | Good |
| Ex. 8 | Good | Good | Good | Good | Good | Poor | Good | Good |
| Ex. 9 | Good | Good | Good | Good | Good | Poor | Good | Good |
| Ex. 10 | Good | Good | Good | Good | Good | Poor | Good | Good |
| Ex. 11 | Good | Good | Good | Good | Good | Poor | Good | Good |
| Ex. 12 | Good | Good | Good | Good | Good | Poor | Good | Good |
| Ex. 13 | Good | Good | Good | Good | Good | Poor | Good | Good |
| Ex. 14 | Good | Good | Good | Good | Good | Poor | Good | Good |
| Ex. 15 | Good | Good | Good | Good | Good | Poor | Good | Good |
| Ex. 16 | Good | Good | Good | Good | Good | Poor | Good | Good |
| Ex. 17 | Good | Good | Good | Good | Good | Poor | Good | Good |
| Ex. 18 | Good | Good | Good | Good | Good | Poor | Good | Good |
| Ex. 19 | Good | Good | Good | Good | Good | Poor | Good | Good |
| Ex. 20 | Good | Good | Good | Good | Good | Poor | Good | Good |
| Ex. 21 | Good | Good | Good | Good | Good | Poor | Good | Good |
| Ex. 22 | Good | Good | Good | Good | Good | Poor | Good | Good |

TABLE 3-continued

| | Bonding Strength Measurement 1 | | | | | | Bonding Strength Measurement 2 | |
| --- | --- | --- | --- | --- | --- | --- | --- | --- |
| | 130° C. | | 150° C. | | 170° C. | | 150° C. | |
| Sample | Adhesiveness | Deformation of Adherend | Adhesiveness | Deformation of Adherend | Adhesiveness | Deformation of Adherend | Adhesiveness | Deformation of Adherend |
| Ex. 23 | Good | Good | Good | Good | Good | Poor | Good | Good |
| Ex. 24 | Good | Good | Good | Good | Good | Poor | Good | Good |
| Ex. 25 | Good | Good | Good | Good | Good | Poor | Good | Good |
| Ex. 26 | Good | Good | Good | Good | Good | Poor | Good | Good |
| Ex. 27 | Good | Good | Good | Good | Good | Poor | Good | Good |
| Ex. 28 | Good | Good | Good | Good | Good | Poor | Good | Good |
| Ex. 29 | Good | Good | Good | Good | Good | Poor | Good | Good |
| Ex. 30 | Good | Good | Good | Good | Good | Poor | Good | Good |
| Ex. 31 | Good | Good | Good | Good | Good | Poor | Good | Good |
| Ex. 32 | Good | Good | Good | Good | Good | Poor | Good | Good |
| Ex. 33 | Good | Good | Good | Good | Good | Poor | Good | Good |
| Ex. 34 | Good | Good | Good | Good | Good | Poor | Good | Good |
| Ex. 35 | Good | Good | Good | Good | Good | Poor | Good | Good |
| Ex. 36 | Good | Good | Good | Good | Good | Poor | Good | Good |
| Ex. 37 | Good | Good | Good | Good | Good | Poor | Good | Good |
| Ex. 38 | Good | Good | Good | Good | Good | Poor | Good | Good |
| Ex. 39 | Good | Good | Good | Good | Good | Poor | Good | Good |
| Ex. 40 | Good | Good | Good | Good | Good | Good | Good | Good |
| Comp. Ex. 1 | Poor | Good | Poor | Good | Poor | Poor | Poor | Good |
| Comp. Ex. 2 | Poor | Good | Good | Good | Good | Poor | Poor | Good |
| Comp. Ex. 3 | Poor | Good | Poor | Good | Good | Poor | Poor | Good |
| Comp. Ex. 4 | Poor | Good | Poor | Good | Good | Poor | Poor | Good |
| Comp. Ex. 5 | Poor | Good | Good | Good | Good | Poor | Poor | Good |
| Comp. Ex. 6 | Poor | Good | Good | Good | Good | Poor | Poor | Good |
| Comp. Ex. 7 | Poor | Good | Good | Good | Good | Poor | Good | Good |
| Comp. Ex. 8 | Poor | Good | Poor | Good | Good | Poor | Poor | Good |
| Comp. Ex. 9 | Poor | Good | Good | Good | Good | Poor | Good | Good |
| Comp. Ex. 10 | Poor | Good | Poor | Good | Good | Poor | Poor | Good |
| Comp. Ex. 11 | Poor | Good | Good | Good | Good | Poor | Good | Good |
| Comp. Ex. 12 | Poor | Good | Poor | Good | Good | Poor | Poor | Good |
| Comp. Ex. 13 | Poor | Good | Poor | Good | Good | Poor | Poor | Good |
| Comp. Ex. 14 | Good | Good | Good | Good | Good | Poor | Good | Good |
| Comp. Ex. 15 | Good | Good | Good | Good | Good | Poor | Good | Good |
| Comp. Ex. 16 | Good | Good | Good | Good | Good | Poor | Good | Good |
| Comp. Ex. 17 | Poor | Good | Poor | Good | Poor | Good | Poor | Good |

It was demonstrated that the thermoplastic adhesive film of the present invention can bond a polypropylene material to a metal material and prevent peeling due to own weight immediately after heat press bonding, and that the bonding destruction mode at that time is cohesive failure or adherend destruction. According to the results shown in Table 2, when the weight applied per bonding area is converted to weight per 1 m², it was shown to withstand up to a own weight of 1,500 kg. Furthermore, it was also demonstrated that bonding in which the bonding destruction mode is cohesive failure of the thermoplastic adhesive film or adherend destruction is possible without deforming the adherend even at 130° C. which was 35° C. lower than the melting temperature of the polypropylene adherend.

INDUSTRIAL APPLICABILITY

In particular, the thermoplastic adhesive film of the present invention makes it possible to bond, without impairing the shape, a resin material such as polypropylene or polyamide to a metal material such as a steel sheet or aluminum, by heating and/or pressurizing such as hot plate pressing, ultrasonic, high frequency, or laser. In addition, when the adherend is taken out immediately after heating and/or pressurizing molding, such as hot pressing or injection molding, peeling due to own weight can be prevented. Therefore, it can be used for adhesion molding of automobile, automotive interior and exterior parts, building material parts, and smart phone or consumer electronics housing and parts without requiring a cooling step after heating and/or pressurizing.

The invention claimed is:

1. A thermoplastic adhesive film comprising, a resin composition (D) comprising:
    a thermoplastic olefin elastomer resin(A);
    an acid-modified polypropylene resin (B);
    a crystal nucleating agent (C); and
    a polypropylene resin (E),
    satisfying a weight ratio [(A)/(E)] of the thermoplastic olefin elastomer resin (A) and the polypropylene resin (E) being from 100/0 to 10/90 (provided that (A)+(E)= 100),
    containing the acid-modified polypropylene resin (B) in an amount of from 20 to 500 parts by weight relative to 100 parts by weight of a total weight of (A) and (E), and
    a ratio of the acid-modified polypropylene resin (B) is 16.6 wt % or more based on the total weight of the resin composition (D),
    wherein the resin composition (D) has a viscosity increase initiation temperature T1 when being cooled from a molten state of 180° C. at a strain of 1%, a share rate of 100 s$^{-1}$ and a cooling rate of 3° C./min and a softening initiation temperature T2 when being pulled at a strain of 1% and a temperature rising rate of 10° C./min while applying oscillation having a frequency from 1 to 100 Hz, satisfying the following Equation (1):

$(T1/T2) \geq 0.90$     Equation (1).

2. The thermoplastic adhesive film according to claim 1, wherein the resin composition (D) has a complex viscosity of 600 Pa·s or more and 10,000 Pa·s or less at 150° C. and a complex viscosity of 4,000 Pa·s or more at 120° C. when being cooled from a molten state of 180° C. at a strain of 1%, a share rate of 100 s$^{-1}$ and a cooling rate of 3° C./min.

3. The thermoplastic adhesive film according to claim 1, wherein the resin composition (D) has a fusion enthalpy measured by a differential scanning calorimeter of 135 J/g or less.

4. The thermoplastic adhesive film according to claim 1, wherein the acid-modified polypropylene resin (B) is obtained by copolymerizing an unsaturated acid anhydride with a polypropylene random copolymer.

5. The thermoplastic adhesive film according to claim 1, wherein the resin composition (D) comprises a near-infrared absorbing material.

6. The thermoplastic adhesive film according to claim 1, wherein the resin composition (D) comprises an inorganic filler.

7. The thermoplastic adhesive film according to claim 1, wherein the resin composition (D) forms at least one surface layer of a multilayer film or sheet.

* * * * *